(12) United States Patent
Trainer et al.

(10) Patent No.: US 8,125,196 B2
(45) Date of Patent: Feb. 28, 2012

(54) ELECTRICAL POWER ARRANGEMENT

(75) Inventors: David R Trainer, Derby (GB); Thomas C J Feehally, Leicester (GB); Stephen A Long, Indianapolis, IN (US)

(73) Assignee: Rolls-Royce PLC, London (GB)

( * ) Notice: Subject to any disclaimer, the term of this patent is extended or adjusted under 35 U.S.C. 154(b) by 451 days.

(21) Appl. No.: 12/458,723

(22) Filed: Jul. 21, 2009

(65) Prior Publication Data

US 2010/0039075 A1 Feb. 18, 2010

(30) Foreign Application Priority Data

Aug. 12, 2008 (GB) .................... 0814621.9

(51) Int. Cl.
*H02P 9/00* (2006.01)
(52) U.S. Cl. ................. 322/58; 290/7; 322/20
(58) Field of Classification Search ............ 322/20, 322/37, 58; 290/7, 40 A
See application file for complete search history.

(56) References Cited

U.S. PATENT DOCUMENTS

| | | | | |
|---|---|---|---|---|
| 3,296,451 | A | * | 1/1967 | Van Ausdal et al. .......... 290/4 R |
| 5,646,458 | A | * | 7/1997 | Bowyer et al. .................. 307/67 |
| 7,675,187 | B2 | * | 3/2010 | Woods et al. ................. 290/1 A |
| 7,687,928 | B2 | * | 3/2010 | Taneja et al. ................ 290/36 R |
| 2005/0245349 | A1 | | 11/2005 | Tabata et al. |
| 2006/0244425 | A1 | | 11/2006 | Sihler |
| 2007/0222407 | A1 | | 9/2007 | Sakamoto et al. |
| 2009/0008936 | A1 | * | 1/2009 | Dooley ............................ 290/7 |

FOREIGN PATENT DOCUMENTS

| | | |
|---|---|---|
| DE | 100 05 178 A1 | 8/2001 |
| JP | A-6-70482 | 3/1994 |
| JP | A-11-41993 | 2/1999 |
| JP | A-2004-208473 | 7/2004 |
| JP | A-2006-320068 | 11/2006 |

OTHER PUBLICATIONS

European Search Report issued in European Patent Application No. 09251782, dated Dec. 7, 2009.

* cited by examiner

*Primary Examiner* — Nicholas Ponomarenko
(74) *Attorney, Agent, or Firm* — Oliff & Berridge, PLC

(57) ABSTRACT

Utilisation of a number of electrical machines such as generators all driven by a common prime mover, such as a gas turbine engine, are known. However, faults in one phase of one particular electrical machine may cause torque vibration and therefore stressing to mechanical linkages between the electrical machine and the prime mover. By determining torque vibration and then utilising a second electrical machine to introduce an anti-phase torque vibration a substantially balanced and steady torque loading to the mechanical linkages can be achieved.

16 Claims, 5 Drawing Sheets

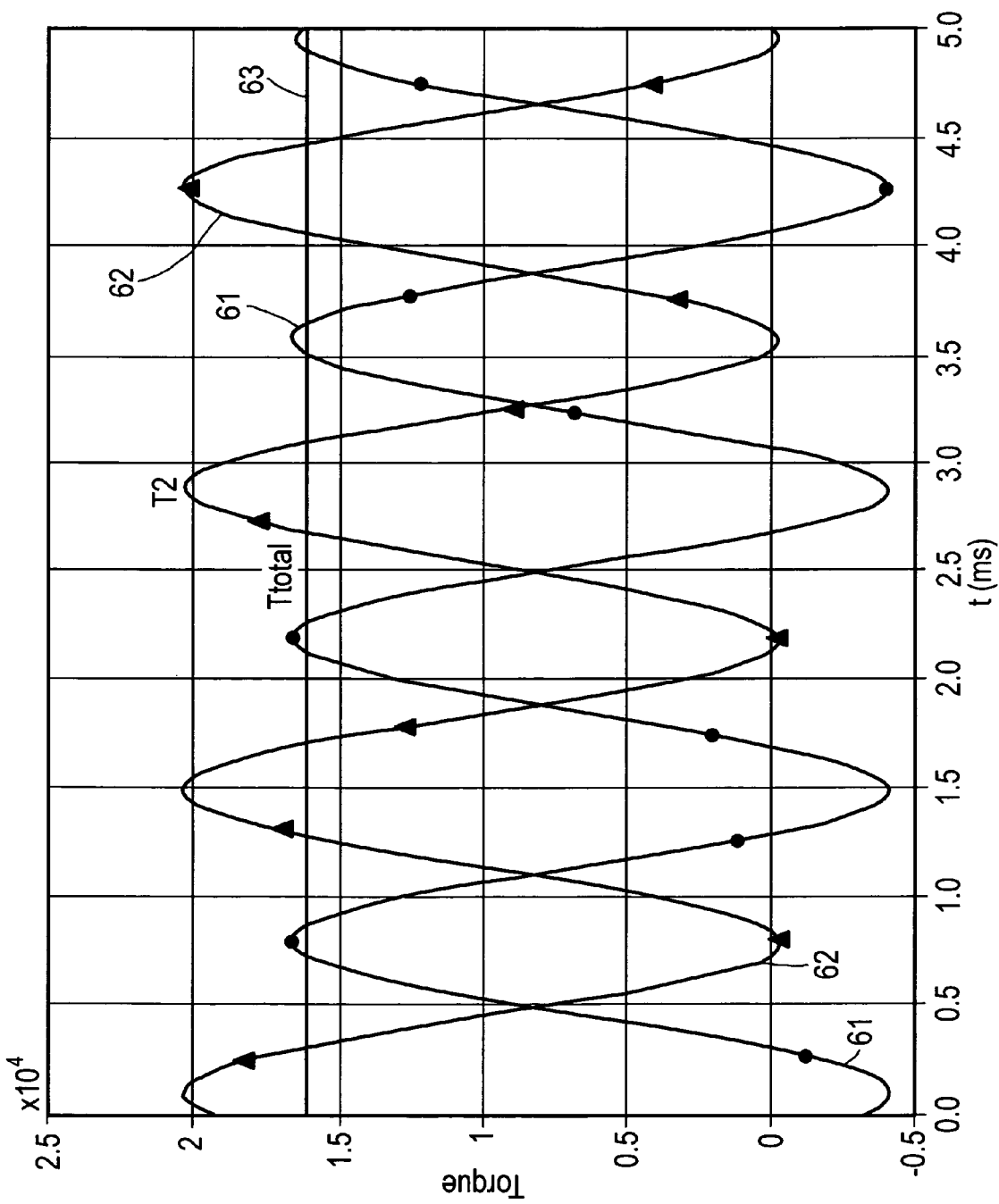

ELECTRICAL POWER ARRANGEMENT

The present invention relates to an electrical power arrangements and more particularly to an electrical power arrangement comprising a number of electrical machines associated with a prime mover, such as a gas turbine engine in order to provide respective electrical power supplies.

BRIEF DESCRIPTION OF THE DRAWINGS

FIG. 7 is a graphic illustration of combined torque presented to a prime mover in accordance with aspects of the present invention.

BRIEF DESCRIPTION OF EMBODIMENTS

Figure 1:
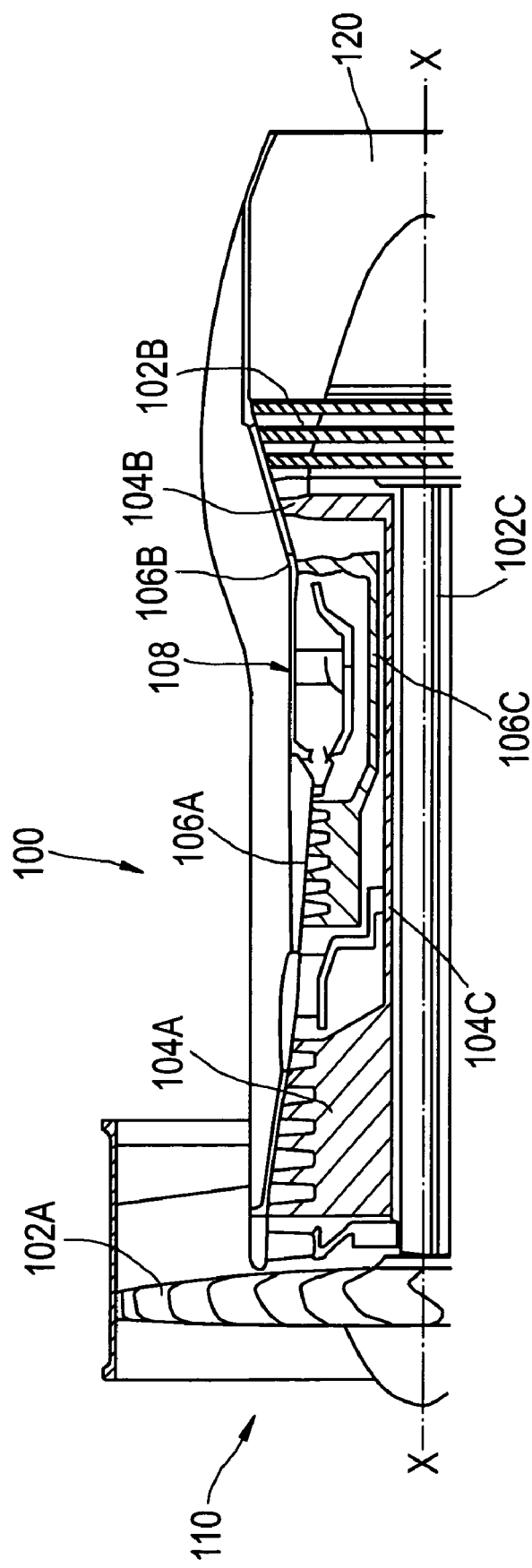
FIG. 1 is a schematic illustration of a gas turbine engine.

FIG. 1 provides a schematic illustration of a gas turbine engine 100. The gas turbine engine 100 compromises three spools, e.g. a low pressure spool 102, an intermediate pressure spool 104 and a high pressure spool 106. The low pressure spool 102 comprises a fan 102A driven by a low pressure turbine 102B through a shaft 102C. The intermediate pressure spool 104 comprises an intermediate pressure compressor 104A driven by an intermediate pressure turbine 104B through a shaft 104C and the high pressure spool 106 comprises a high pressure compressor 106A driven by a high pressure turbine 106B through a shaft 106C. These three spools 102, 104 and 106 are arranged coaxially with the low pressure spool 102 arranged within the intermediate pressure spool 104 and the intermediate pressure spool 104 arranged within the high pressure spool 106. Thus in operation air flows from an inlet 110 sequentially through the fan 102A, the intermediate pressure compressor 104A and the high pressure compressor 106A to a combustor 108. Hot gases produced in the combustor 108 by burning fuel in the air flow sequentially through the high pressure turbine 106B, the intermediate pressure turbine 104B and the low pressure turbine 102B to an outlet 120. Alternatively the gas turbine engine may comprise two spools, a low pressure spool and a high pressure spool or a single spool.

A mechanical transmission takes power from a rotor associated with the intermediate pressure spool 104, the high pressure spool 106 or possibly the low pressure spool 102 and transmits it to respective electrical machines 2, 3 through gears 4 and shafts 5, 6, 7 and 8 in order to generate electrical power for operation of parts of the gas turbine engine 100 and other requirements of an associated aircraft. The gears 4 and shafts 5, 6, 7 and 8 also takes power from the electrical machines 2, 3 and transmits it to a rotor 9 associated with the intermediate pressure spool 104, the high pressure 106 or the low pressure spool 102 during starting of the gas turbine engine 100 or for other purposes.

It will be understood the rotor 9 may a shaft/rotor related to one of the three spools 102, 104 or 106.

It is known to provide electrical power arrangements in which a number of electrical machines, typically in the form of electrical power generators, are associated with a prime mover, such as a gas turbine engine or internal combustion engine. In such circumstances a degree of redundancy is provided with regard to the potential for one of the electrical machines to fail as well as the ability to provide electrical power at different voltages. With regard to an aircraft, traditionally gas turbine engines are provided in order to produce high levels of thrust, but not to generate significant quantities of electrical power. It will be appreciated that extraction of large quantities of electrical power from a gas turbine engine through associated electrical machines may create transient and unstable variations upon the loading to the machine and therefore potential difficulties.

Requirements for significant quantities of electrical power in gas turbine engines utilised for aircraft propulsion relate to increased use and numbers of electrical loads upon the aircraft. Electrical loading is reflected as a torque loading to the mechanical linkages from the gas turbine engine. Each mechanical linkage is typically a shaft and/or gear train. In such circumstances the variations in loading from the electrical machines is transferred to the mechanical transmission system of the engine and back to the rotating spools of that engine. It will be appreciated in some circumstances the transmitted torque can affect overall engine performance, speed and fuel consumption.

Generally, and previously, gas turbine engines have been tolerant to the small amounts of torque created by electrical loading and as such low levels of electrical power extraction have created insignificant mechanical stressing. Nevertheless, as indicated with higher levels of torque variation created by large electrical loading changes, it is necessary to consider the effects of such variations. In such circumstances it would be desirable to manage torque stressing and interaction between the electrical systems and the mechanical systems of a gas turbine engine. It will also be understood that with regard to electrical loads in an aircraft there is a relatively higher portion of non-linear and pulse loads which are often controlled by power electronic conversion. In such circumstances power drawn by the electrical system from the mechanical system may be far from smooth and continuous.

Figure 2:
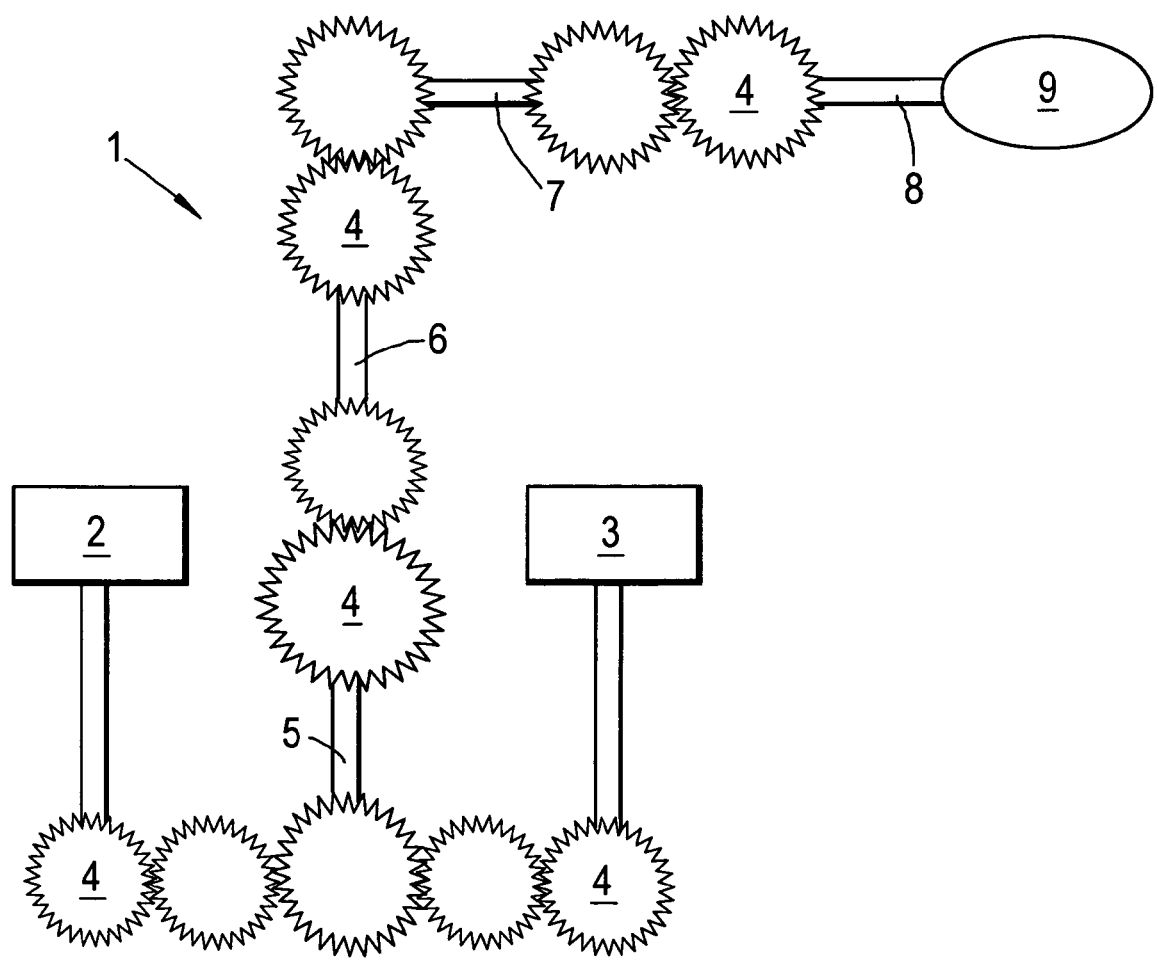
FIG. 2 is a schematic illustration of a prior art electrical power arrangement including electrical machines driven by a prime mover via gears and shafts.

FIG. 2 provides a schematic illustration of a typical prior electrical power arrangement 1 in which respective electrical machines 2, 3 are associated through gears 4 and shafts 5, 6, 7, 8 with a prime mover in the form of a rotor 9. In such circumstances it will be appreciated that the gears 4 and the shafts 5 to 8 provide a significant and relatively vulnerable mechanical linkage between the electrical machines 2, 3 and the rotor 9 as a prime mover. Variations in the electrical load to and from the electrical machines 2, 3 will be reflected in stressing through the mechanical linkages defined by the gears 4 and shafts 5 to 8. Such stressing may lead to premature failure of the mechanical linkages and therefore failure overall. Nevertheless, it will be appreciated that providing more than one electrical machine in the form of generators will provide redundancy levels and also allow transmitted torque split due to electrical loading to be presented two ways so reducing torque stress on individual components.

Figure 3:
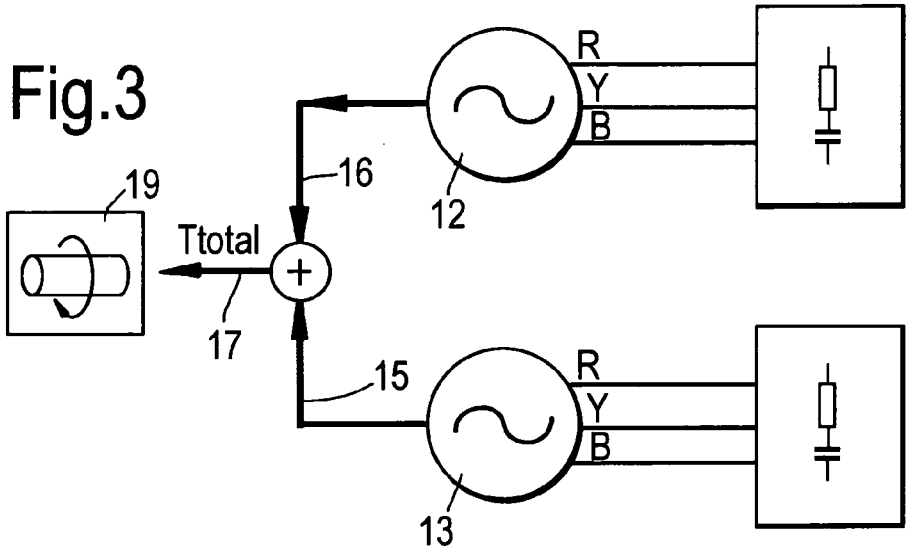
FIG. 3 is a schematic illustration of the power/torque transfer paths between the prime mover and electrical machines shown in FIG. 2.

FIG. 3 provides a schematic illustration of the power/torque transfer paths between a prime mover 19 and two three phase generators 12, 13. The electromagnetic torque created by each generator 12, 13 is directly proportional to the sum of per phase electrical power. The total torque which is exerted through the mechanical linkages is the sum of the torque taken from each generator 12, 13. It will be understood that in normal operation there is a balanced three phase loading and therefore the torque produced by each generator 12, 13 is steady. However, during unbalanced conditions, and in a worse case scenario a line to line or line to ground fault, such torque imbalance creates oscillations at a second harmonic with respect to the generation frequency. This torque oscillation is transferred on to the mechanical linkages shown schematically as 15, 16 and therefore the linkage 17 to the prime mover 19. In such circumstances there is a potential for very high levels of stressing to the mechanical linkages and therefore premature failure. Torque oscillations may occur at a range of different frequencies dependent upon electrical loading and therefore can be difficult to deal with.

Figure 4:
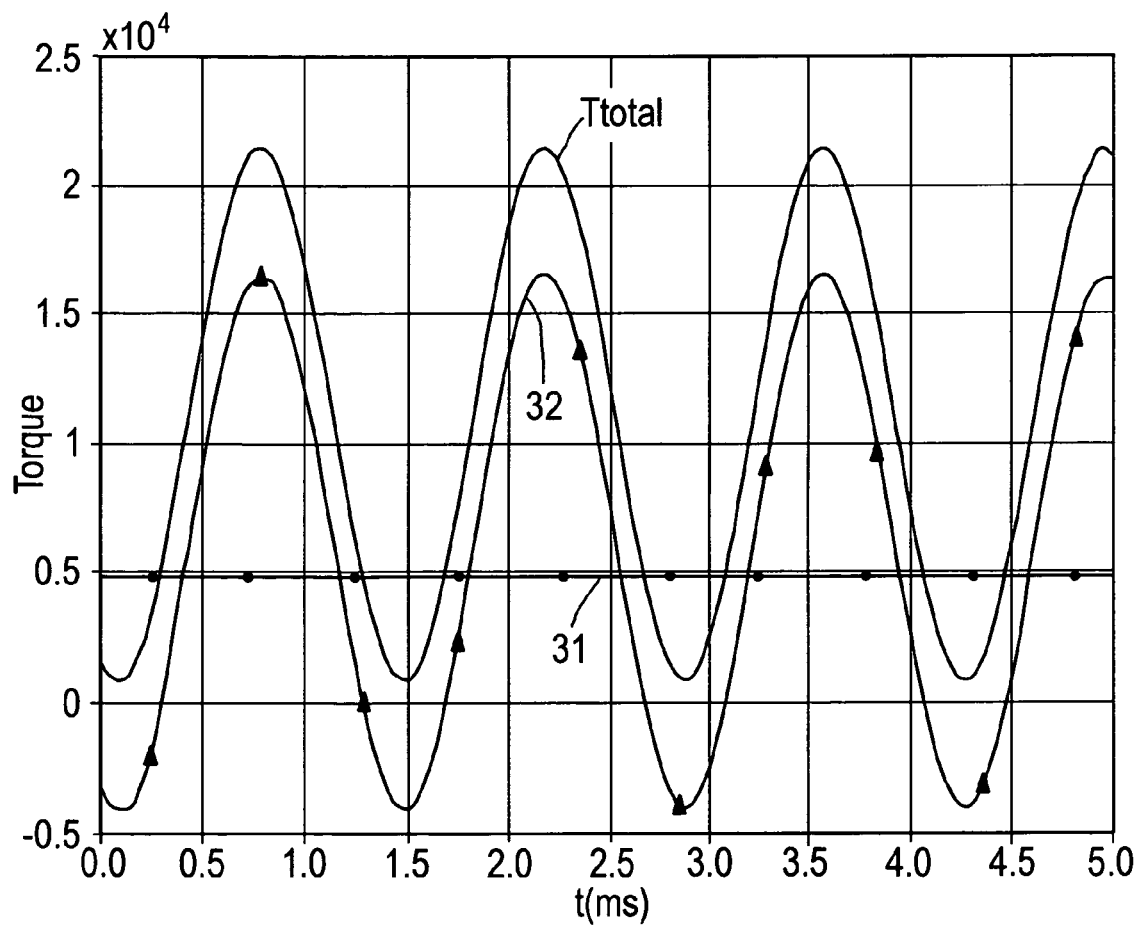
FIG. 4 is a graphic illustration of the combined torque presented to a prime mover shown in FIG. 3 when a first electrical machine has a line to line electrical fault.

FIG. 4 provides a graphic illustration for torque profiles from two electrical machines as generators in terms of total torque exerted to a mechanical linkage transmission system. Both electrical generators have a balanced resistive load, whilst a first generator has a line to line electrical fault. It will be noted that there is oscillation in the torque and therefore stressing to the mechanical linkages. The second electrical machine as depicted by line 31 produces a steady torque whilst the first electrical machine produces an oscillating torque depicted by the line 32. In such circumstances as can be seen the total torque depicted by line 33 oscillates and it is this oscillation which will causes stressing to the mechanical linkages of a power generator arrangement.

In accordance with aspects of the present invention there is provided an electrical power arrangement comprising a plurality of electrical machines for loads, each electrical machine is associated together through mechanical linkages with a prime mover, the electrical machines presenting a combined torque value to the prime mover, each electrical machine having a multi-phased operation and the arrangement including means to determine torque vibration upon a mechanical linkage due to a fault of one phase of a first electrical machine to an associated load and the arrangement having a phase control for a second electrical machine to vary one or more phases of the second electrical machine to maintain a stable combined torque value through the mechanical linkages.

Alternatively, according to aspects of the present invention, there is provided a method of operating an electrical power arrangement comprising a plurality of electrical machines for loads, each electrical machine is associated through mechanical linkages with a prime mover in order to present a combined torque value to the prime mover, each electrical machine having a multi-phased operation, the method comprising determining torque vibration in the mechanical linkage due to a fault of one phase of a first electrical machine to an associated load and varying one or more phases of the second electrical machine to maintain a stable combined torque value through the mechanical linkages.

Typically, the electrical machines have a three phase operation. Generally, the electrical machines are electrical generators.

Possibly each electrical machine provides a different voltage.

Possibly, a vibration sensor is provided for each electrical machine. Possibly, a vibration sensor is arranged on the mechanical linkages to determine the combined torque presented to the prime mover.

Generally, the phase control comprises means to generate an anti-phase torque oscillation to cancel the torque vibration upon the mechanical linkage due to the fault of one phase of the electrical machine. Possibly, the phase control comprises a capacitive load and/or an inductive load arranged across the phases of the second electrical machine.

An embodiment of aspects of the present invention will now be described by way of example only with reference to FIGS. 5, 6 and 7.

As indicated above oscillations in presented torque to a prime mover such as a spool of a gas turbine engine results in stressing and therefore premature failure of mechanical linkages. By aspects of the present invention determination of vibrations in terms of oscillations in torque presented to a prime mover are first determine and then through active vibration control through a phase control for each electrical machine of a power arrangement smoothing provided. By independently controlling the reactive power for each electrical phase the electromagnetic torque developed by a generator as an electrical machine can be precisely controlled. For a given torque oscillation from a first electrical machine or generator by aspects of the present invention a second electrical machine can be controlled to produce an anti-phase torque oscillation. In such circumstances the torque oscillation through both electrical machines will cancel each other out leaving a constant torque value upon the mechanical leakages as the transmission system to the prime mover. By maintaining a substantially constant torque upon the mechanical linkages it will be appreciated that there is less torque stressing to those mechanical components.

Figure 5:
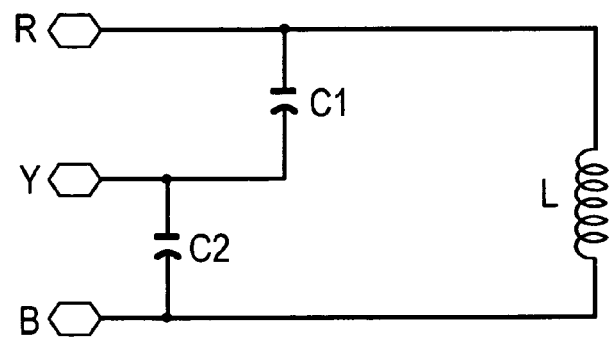
FIG. 5 is a schematic illustration of a phase control or vibration control arrangement utilised in accordance with aspects of the present invention.

FIG. 5 provides a component illustration of an electrical network capable of unbalancing the power flow within an electrical machine. This electrical network will be associated with the second electrical machine in order to create unbalance and therefore an anti-phase torque oscillation for cancellation of the fault load for net torque stability and balance. It will be understood that within an electrical power arrangement in accordance with aspects of the present invention generally a plurality of electrical machines will be provided. Each electrical machine will typically incorporate a vibration control arrangement in terms of a phase control in accordance with aspects of the present invention. The phase control can create an anti-phase torque oscillation in respect of a fault on another first electrical machine supply.

As will be understood by a person skilled in the technology the levels of reactive power that are required to create a suitable anti-phase torque vibration can be determined for each phase by calculating from a measurement of the torque oscillation or measurements made from the overall electrical machine operation, or a combination of both. In such circumstances the necessary reactive power in terms of the anti-phase torque oscillation to cancel a fault torque oscillation can be determined through an appropriate controller or iteratively until substantial balance occurs for torque stability.

The reactive power in terms of an anti-phase torque oscillation may be provided to the power arrangement through existing connections to an electrical network of the electrical power arrangement. Alternatively, dedicated reactive power compensation equipment and installations may be provided to improve performance.

As can be seen in FIG. 5 each phase R, Y, B is coupled to capacitive elements C1, C2 and inductive element L values which can be switched appropriately as required in order to create the necessary reactive power for an anti-phase torque cancellation with a torque oscillation created by a fault as will be described later with regard to FIG. 6. As indicated above the actual values for the capacitive and inductive loads which combine to provide the reactive load in the second or reactive electrical machine according to aspects of the present invention may be determined in a number of ways. Firstly, the values for the reactive load created by the capacitive load and inductive load may be fixed. In such circumstances if the vibration sensor arrangement determines torque oscillation is due to a fault in a particular phase of a first electrical machine then simply a set response on a second electrical machine will be provided by the phase control in accordance with aspects of the present invention. Alternatively, the torque oscillation in terms of vibration sensing may be specifically determined for utilisation in an appropriate calculation to determine the reactive values needed by the reactive capacitance C1, C2 and inductive reactance L in the second electrical machine in order to respond accurately to the current torque vibration conditions. Such an approach will provide a rapid dampening of torque oscillations on the mechanical linkages to the prime mover. A further alternative is to simply determine torque oscillation is present and then by interactive step increments provide progressive changes in the values for capacitance C1, C2 and inductance L for adjustment of the electrical machine until damping and substantially balanced combined torque is presented to the prime mover along the mechanical linkages in accordance with aspects of the present invention. Each approach may have benefits in terms of operability and acceptability in terms of extra complexity to the electrical power arrangement or rapidity of response.

In terms of torque oscillation vibration determination, it will be understood that the sensors for such torque vibration determination can be presented at a number of locations within the mechanical linkages between the electrical machines and the prime mover. In such circumstances the determination of the reactive response can be chosen appropriately. Vibration sensing may be provided for each mechanical linkage directly from each electrical machine. In such circumstances a choice of the second or reactive electrical machine utilised to provide the anti-phase torque oscillation response can be determined by a controller depending upon the loadings of other electrical machines. The sensors may be at an intermediate position within the mechanical linkages whereby the oscillation vibration in the mechanical linkages may be from a number of electrical machines and in such circumstances an analytical test for each electrical machine may then be conducted in order to determine if there is a fault in one of the phases of that machine which requires a response. The benefit of providing torque oscillation vibration sensing at an intermediate position is that only one such sensor may be required reducing complexity whilst depending upon each electrical machine's own diagnostics for determining faults which may be causing that torque oscillation vibration. A negative aspect of providing an intermediate torque vibration sensor or a torque vibration sensor near to the prime mover would be that there would be greater complexity in terms of determining the cause of such torque oscillations as well as the greater likelihood that such torque oscillations will have had a negative impact upon parts of the mechanical linkages prior to the vibration sensor for a greater period of time resulting in mechanical stressing which could be avoided by sensing more directly and closely with each electrical machine.

Figure 6:
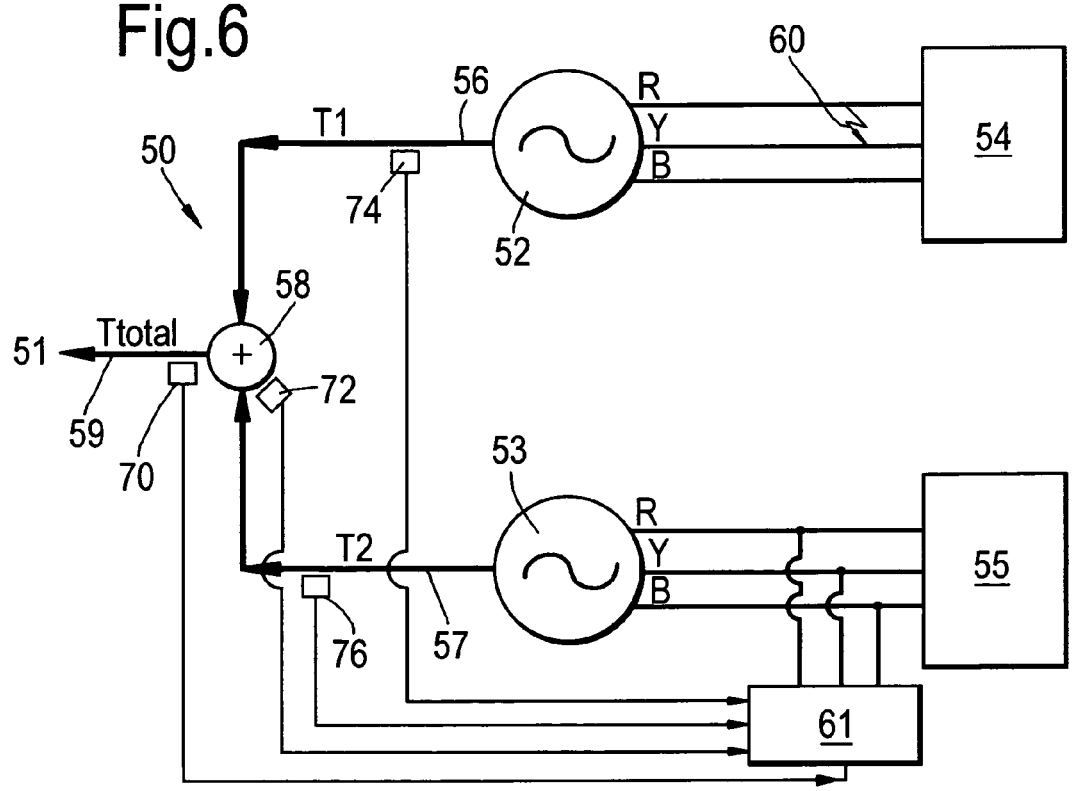
FIG. 6 is a schematic illustration of an electrical power arrangement in accordance with aspects of the present invention.

FIG. 6 provides a schematic illustration of an electrical power arrangement 50 in accordance with aspects of the present invention. Thus, electrical generators 52, 53 have respectively three phases R, Y, B to which respective loads 54, 55 are associated. The electrical machines 52, 53 are associated with a prime mover 51 such as a gas turbine engine through mechanical linkages 56, 57 to a gearbox 58 or other device such that a combined or consolidated torque, $T_{Total}$, is presented to the prime mover 51. In normal operation the total torque, $T_{Total}$, is relatively stable and smooth such that the mechanical linkages 56, 57, 58 are not subject to oscillating vibrations which will cause stressing.

As illustrated in FIG. 6 a line to line fault 60 occurs between phases R, Y across the load 54. The fault 60 will cause torque oscillation through the generator 52 and the mechanical links 56 to the total torque, $T_{Total}$, presented to the prime mover 51. This vibration in torque will stress the mechanical linkages and, as indicated above, may cause premature failure, or inefficient operation.

In accordance with aspects of the present invention a vibration control device 61 is presented across the phases R, Y, B of the second generator 53. The device 61 acts as a phase control to introduce through the generator 53 an anti-phase torque vibration through the mechanical linkages 57 to the prime mover 51. In such circumstances the respective torque vibration as a result of the fault 60 is balanced and cancelled out by the introduced anti-phase torque vibration created by the phase control device 61. By balancing the torque vibration across the mechanical linkages 56, 57, 59, less stressing occurs.

Generally, the phase control device 61 will be configured in order to provide the necessary anti-phase torque vibration as required. In order to achieve this appropriate response, it will be understood that the level of torque vibration must be determined within the arrangement 50. As indicated above, this sensing of torque vibration can occur at a number of positions and the values consolidated in order to provide, through appropriate calculation, or a look-up table, or iteratively, a response by the device 61 in order to achieve balance and stabilisation of the total torque, $T_{Total}$, in use.

As mentioned previously the sensors to detect torque vibration may be provided at a number of locations within the mechanical linkages between the electrical machines 52, 53 and the prime mover 51.

Sensors 74, 76 may be provided on mechanical linkages, eg shafts 56, 57 coupling the electrical machines 52, 53 respectively to the gearbox 58 such that a vibration sensor is provided for each electrical machine 52, 53. Alternatively, or in addition, sensors 70 may be provided on mechanical linkages 59 e.g. gearbox and shafts etc and/or a sensor may be provided on mechanical linkage 58 e.g. gearbox, to determine the combined torque presented to the prime mover 51. The mechanical linkages 58 and 59 carry the combined torque between the electrical machines and the prime mover 51, 52, 53 whereas mechanical linkages 56 and 57 only carry torque between the respective electrical machines 52 and 53 and the prime mover 51. The sensors 70, 72, 74, 76 are arranged to send vibration signals to the vibration control device 61.

FIG. 7 provides a similar graphic representation to that depicted with regard to FIG. 4 previously, but with an arrangement in accordance with aspects of the present invention. In such circumstances, as can be seen, a first electrical machine produces an oscillating, and therefore vibrating, torque response depicted by line 62 whilst a second electrical machine for utilising a phase control in accordance with aspects of the present invention creates an anti-phase torque oscillation vibration 61, such that the total torque, $T_{Total}$, is substantially stable and depicted by line 63. The response of the second electrical machine is anti-phase rather than providing a steady torque value as previously. Such stable torque total, $T_{Total}$, will result in less mechanical stressing to the mechanical linkages of the arrangement. Ideally, the total torque oscillation should be substantially zero, as presented to the mechanical linkages, however such a situation may be difficult to achieve practically in view of potential variations in the fault and other factors with regard to electrical machines in accordance with aspects of the present invention.

As illustrated in FIG. 6, one example of a fault is a line to line fault between phases in an electrical machine. Alternative forms of fault are a line to earth fault or persistent phase imbalance within the load 54. In any event, in accordance with aspects of the present invention, by effectively pairing and matching the electrical machines in terms of their torque effect and therefore torque oscillation upon the mechanical linkages, a balance can be achieved to maintain a substantially stable torque as presented by the electrical machine to the mechanical linkages.

By the above approach a reduced mechanical torque stress is presented upon key mechanical transmission components. Such a reduction in torque stress is achieved by controlling electrical system responses through the electrical machines and particularly when those machines are generators. Such reduction in torque stressing upon the mechanical transmission components will increase the lifespan and reduce the necessity for providing more robust and therefore generally weightier and larger components in use.

As indicated above, generally in accordance with aspects of the present invention the prime mover will be a gas turbine engine utilised in an aircraft. Such arrangements generally provide two or more generators to achieve redundancy such that the electrical power is provided to the necessary electrical actuators and other loads. However, the arrangement and the method in accordance to aspects of the present invention may be utilised in other electrical systems where size, weight and cost of installed equipment is desirably minimised. Examples of such areas of applicability therefore include, in addition to aerospace also marine, industrial and energy generation systems.

Modifications and alterations to aspects of the present invention will be appreciated by persons skilled in the art. Thus for example, as indicated above, the sensing of torque vibration may occur at different positions within the arrangement. Vibration sensors may be associated with particular parts of the mechanical linkage and transmission systems, and particularly those which are susceptible to premature failure when stressed. Vibration sensing may occur at various locations in the arrangement with appropriate weighting dependent upon the necessary strategy for substantially equalising and balancing of the fault induced torque oscillation and the anti-phase oscillation introduced by the second electrical machine for balancing torque profiles.

We claim:

1. An electrical power arrangement comprising a plurality of electrical machines for loads, each electrical machine is associated through mechanical linkages with a prime mover, the electrical machines presenting a combined torque value to the prime mover, each electrical machine having a multi-phased operation, the arrangement including means to determine torque vibration upon the mechanical linkage due to a fault of one phase of a first electrical machine to an associated load and the arrangement having a phase control for a second electrical machine to vary one or more phases of the second electrical machine to maintain a stable combined torque value through the mechanical linkages.

2. An arrangement as claimed in claim 1 wherein the electrical machines have a three phase operation.

3. An arrangement as claimed in claim 1 wherein the electrical machines are electrical generators.

4. An arrangement as claimed in claim 1 wherein each electrical machine provides a different voltage.

5. An arrangement as claimed in claim 1 wherein a vibration sensor is provided for each electrical machine.

6. An arrangement as claimed in claim 1 wherein a vibration sensor is arranged on the mechanical linkages to determine the combined torque presented to the prime mover.

7. An arrangement as claimed in claim 6 wherein each electrical machine has an analytical tester to determine if there is a fault in one of the phases of that electrical machine.

8. An arrangement as claimed in claim 1 wherein the phase control comprises means to generate an anti-phase torque oscillation to cancel the torque vibration upon the mechanical linkage due to the fault of one phase of the first electrical machine.

9. An arrangement as claimed in claim 8 wherein the phase control comprises a capacitive load and/or an inductive load arranged across the phases of the second electrical machine.

10. A gas turbine engine incorporating an electrical power arrangement as claimed in claim 1.

11. A method of operating an electrical power arrangement comprising a plurality of electrical machines for loads, each electrical machine is associated through mechanical linkages with a prime mover in order to present a combined torque value to the prime mover, each electrical machine having a multi-phase operation, the method comprising determining torque vibration in the mechanical linkage due to a fault of one phase of a first electrical machine to an associated load and varying one or more phases of the second electrical machine to maintain a stable combined torque value through the mechanical linkages.

12. A method as claimed in claim 11 wherein the electrical machines have a three phase operation.

13. A method as claimed in claim 11 wherein the electrical machines are electrical generators.

14. A method as claimed in claim 11 comprising sensing vibrations for each electrical machine.

15. A method as claimed in claim 11 comprising sensing vibrations of the mechanical linkages to determine the combined torque presented to the prime mover.

16. A method as claimed in claim 11 comprising generating an anti-phase torque oscillation to cancel the torque vibration upon the mechanical linkage due to the fault of one phase of the first electrical machine.

* * * * *